JOHN R. MASON
*INVENTOR.*

BY Allan M. Shapiro

ATTORNEY

United States Patent Office 3,736,199
Patented May 29, 1973

3,736,199
DEVICE AND METHOD FOR INSTALLING
SURFACE MOLDING
John R. Mason, Los Angeles, Calif., assignor to Dracon
Industries, Chatsworth, Calif.
Filed May 3, 1971, Ser. No. 139,358
Int. Cl. E04b 13/10
U.S. Cl. 156—71                                    6 Claims

ABSTRACT OF THE DISCLOSURE

Surface molding has a uniform cross section for extrusion, and has an adhesive-faced surface for attachment to a body. Its convex outer face defines the configuration of the surface of revolution on a molding-applying roller. The molding applying roller is manually operable and rotatable on the axis of the surface of revolution.

The method comprises engaging the adhesive-faced surface of the molding upon a body, and engaging the curved surface of revolution of the roller against the outer molding face, moving the roller in a direction along the length of the molding normal to the axis of the roller, and applying a force having a component normal to both the direction of motion and the direction of the axis so that the molding is adhesively attached to the body.

BACKGROUND OF THE INVENTION (1) Field of the invention

This invention is directed to a device and method for installing a surface molding, and particularly, a roller for moving along the length of a molding to adhesively attach the molding to a body.

(2) Description of the prior art

One of the present day uses of the molding of the nature for which the present device and method is useful is on the side of the automotive vehicle, in order to prevent paint chipping and other minor damage due to small impacts. Such molding is extruded of thermoplastic material, and must necessarily be fairly rigid, not completely limp, at ordinary outside ambient temperatures. The fairly flat back surface is an adhesive-faced surface for attachment to the body of the automotive vehicle. Such molding often does not properly bend for complete, reliable adhesive attachment when it is cold. Ordinary heating, such as by a torch, desirably softens the molding so it it bendable but also to such an extent that it is undesirably easy to cause excessive deformations. In such a case, dimples, flats, and finger marks are easily indented into the molding when it is applied under such conditions. Thus, it is difficult to install present molding with optimum appearance.

SUMMARY OF THE INVENTION

In order to aid in the understanding of this invention, it can be stated in essentially summary form that it is directed to a device and method for installing surface molding. The device comprises a roller mounted for rotation on an axis of revolution. The roller has a surface of revolution positioned about the same axis. The surface of revolution is such as to engage over the outer face of a molding to be adhesively attached to a body.

The method comprises positioning an adhesive-faced surface of a molding on a body surface to which it is to be attached, applying a roller against the molding in a manner such that the roller engages substantially the entire outer face of the molding, and applying a force toward the body surface while moving the roller along the length of the molding to adhesively attach the molding to the body without excessive, unsightly deformation of the molding, particularly its outer surface.

Accordingly, it is an object of this invention to provide an apparatus by which a molding can be attached to a body without excessive deformation of the molding. It is a further object to provide an apparatus which comprises a roller for the engagement on a flexible molding, so that the molding can be rolled onto a surface. It is another object to provide an apparatus which comprises a surface of revolution corresponding substantially to the shape of the outer face of an extruded flexible molding, so that the outer face of the molding is almost fully engaged by the roller to force the molding against the surface. It is another object to provide a roller which provides substantially non-deforming forces against the flexible molding so that adhesive on the molding is forced against the body to which the molding is to be attached, for full adhesive engagement. It is still another object to provide a method for employing such an apparatus to attach molding onto a body. It is yet another object to provide a method which comprises applying proper force to cause full adhesive engagement of a flexible molding onto a body.

Still other objects, features, and attendant advantages of the present invention, together with modifications and equivalents, will become apparent to those skilled in the art from a reading of the following detailed description of the preferred embodiment, constructed in accordance therewith, taken in conjunction with the accompanying drawings wherein like numerals designate like parts of the several figures.

DESCRIPTION OF THE PREFERRED EMBODIMENT

Figure 1:
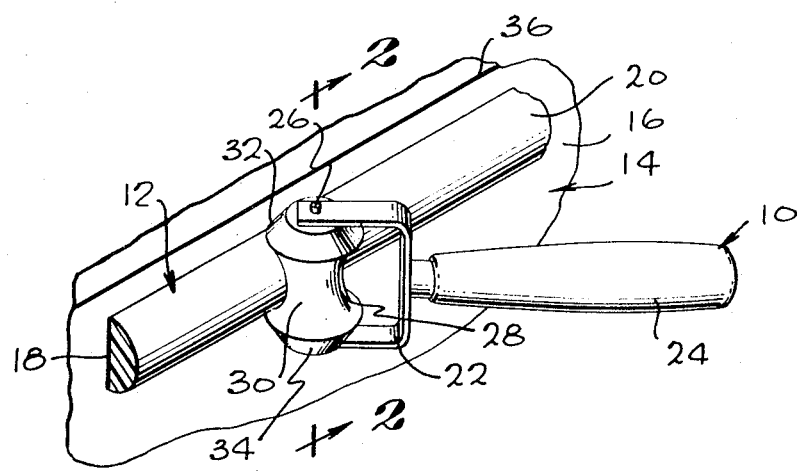
FIG. 1 is an isometric view, with parts broken away, showing the device for installing surface molding, in accordance with this invention.
Figure 2:
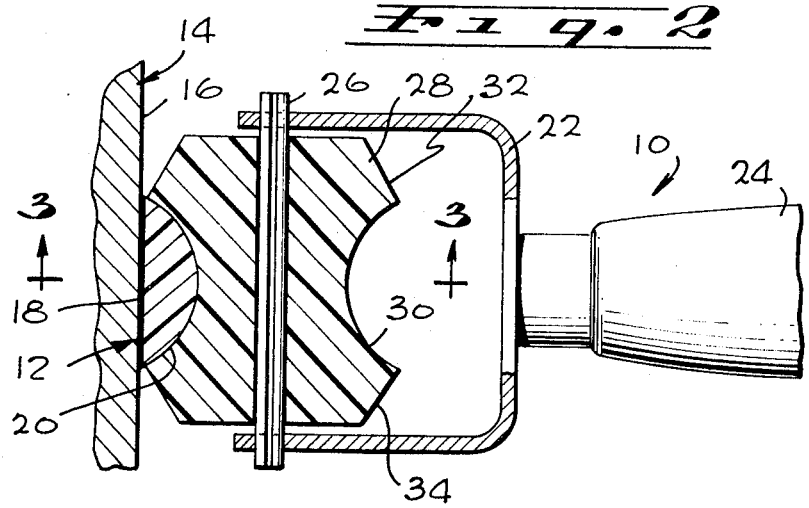
FIG. 2 is an enlarged section taken generally along the line 2—2 of FIG. 1, with parts broken away.
Figure 3:
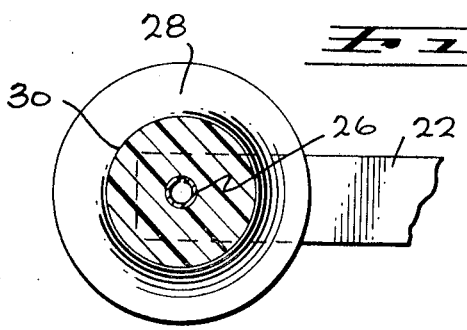
FIG. 3 is a section taken generally along the line 3—3 of FIG. 2.

FIG. 1 illustrates the roller device 10 of this invention employing the method of this invention to install the surface molding 12 onto body 14 which has an outside surface 16. Body 14 is conveniently an automotive vehicle, in accordance with this invention, but can be any other body having a surface 16 to which a surface molding 12 is to be applied. Surface molding 12 has an adhesive-faced surface 18. The thick line at the left of surface molding 12 in FIG. 2 represents adhesive 18 for attachment of the molding 12. The adhesive is preferably a pressure-sensitive adhesive, and may be in the form of a double-faced pressure-sensitive adhesive tape attached to the back of molding 12 to define the adhesive-faced surface. Conveniently, the adhesive extends from edge to edge on the rear of the molding, or may be recessed into the molding so that the adhesive is fairly even with the contact of the molding with the outside surface 16.

Surface molding 12 is preferably extruded from thermoplastic synthetic polymer composition material, of which polyvinyl chloride is an example of a suitable material. The composition of the material is such that it is somewhat flexible and sufficiently resilient to absorb small impacts, without damage to the molding or to the body 14. For this purpose, it has a convex outer face 20 to extend beyond the outside surface 16 of body 14 to receive these impacts. Any convenient configuration of convex outer face 20 to satisfy this function is satisfactory. A portion of a circular arc is illustrated. In that configuration, the adhesive-faced back is a chord of the circle.

When formed in the above described preferred manner, the surface molding 12, when cold, is sometimes too inflexible for full and adequate attachment of the adhesive-faced back surface to the body surface 16, particularly when the body surface 16 has some degree of curvature. To overcome this inadequate flexibility, and in view of the thermoplastic nature of the material of molding 12, the molding 12 is conventionally heated. Such heating of the molding provides the adequate flexibility for proper attachment. The adhesive-faced surface 18 is then placed in full adhesive contact with the surface 16 of the body. Heating the molding thus provides the thermoplastic flexibility, but permits the convex outer face 20 of the molding 12 to be excessively deformed during installation, by the creation of dimples, flats, and finger marks in this face of the molding during application.

To overcome this problem, roller device 10 is provided. As seen in the drawings, device 10 has a yoke 22 mounted on manually-engageable handle 24. Pivot pin 26, in the form of a roll pin, is mounted across the yoke 22 in suitable holes therein. The roll pins resiliently expand within the holes in yoke 22 so as to be firmly secured therein without the need for additional fasteners. Roller 28 is rotatably mounted on pivot pin 26 which defines an axis of rotation.

Roller 28 is formed with a surface of revolution 30 about the axis. The surface of revolution has the same cross section as the convex outer face 20 of surface molding 12, as shown in FIG. 2. Also, as illustrated in that figure, the surface of revolution 30 extends almost all the way around the convex outer face 20 and nearly, but not quite, engages the outer surface 16. Above and below the surface of revolution 30, roller 28 has truncated cones 32 and 34 which have smaller diameters at the ends of the roller, as compared to their juncture with the surface of revolution 30. Thus, roller clearance is provided away from the surface of revolution 30 which contacts with convex outer surface 20. As discussed above, the circular arc is the preferred shape of the convex surface 20, and thus of the surface of revolution 30. However, if another shape is provided for convex surface 20, a corresponding shape is provided for the surface of revolution 30.

The method for installing surface molding, in accordance with this invention, comprises the steps of defining an orientation line 36 along the outside surface 16 of body 14 to which the surface molding 12 is to be aligned along the body 14. Next, the surface molding 12 is heated, if necessary, to provide the necessary flexibility for proper attachment and is positioned with its adhesive-faced surface 18 against the outside surface 16 of body 14, and with one of its edges positioned with respect to the orientation line 36. Next, device 10 is applied with the surface of revolution 30 of the roller 28 against the convex outer face 20. Force is applied from the roller 28 onto the surface molding and from the surface molding through adhesive face 18 to the outside surface 16, having a force component normal to the surface 16. This force attaches molding 12 to body 14. The force is applied along a line extending substantially from edge to edge of molding 12 along its face 20, by engagement of the surface of revolution 30 upon the surface 20. Concurrently with that application of force, device 10 is moved along the length of molding 12 to roll the molding down onto body 14 for uniform, secure adhesive attachment. If heating is required, these steps are accomplished in a sufficiently short length of time that they are completed before the temperature of surface molding 12 falls to a point where it is inadequately flexible for proper application. Thus, the molding is accurately and firmly attached.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An apparatus for installing surface molding comprising:
   a non-deformable roller rotatably mounted upon an axis for rotation about said axis, a smooth concave surface of revolution on the external surface of said roller about said axis of rotation, said surface of revolution being shaped to fit upon the convex outer face of a surface molding, said roller being relieved away from said surface of revolution so as not to contact a body onto which the molding is to be rolled.

2. The apparatus of claim 1 wherein said roller is mounted upon a manually-operable handle.

3. The apparatus of claim 2 wherein a yoke is mounted upon said handle and a roll pin extends across and is secured to said yoke, said roller being rotatably mounted upon said roll pin to rotate upon its axis.

4. The method for installing surface molding upon a body comprising the steps of:
   positioning an adhesive-faced back surface of the surface molding against the body;
   applying a force having a component normal to the back surface of the body against a convex outer face of the surface molding substantially from edge to edge thereof and at only a portion of the molding so as to uniformly force that portion of the molding against the body where the force is applied; and
   moving the point of application of the force of the molding against the body along the length of the molding to attach the entire length of the surface molding to the body.

5. The method of claim 4 further including the preliminary step of:
   preheating the surface molding to permit it to be closely configured to the surface of the body as the attaching force is applied to the surface molding and is moved along the length of the surface molding.

6. The method of claim 5 further including the preliminary step of:
   marking an orientation line on the body; and wherein the positioning step comprises:
   positioning the surface molding with respect to the orientation line on the body so that the surface molding is attached to the body with reference to the orientation line.

References Cited
UNITED STATES PATENTS

| | | | |
|---|---|---|---|
| 1,162,425 | 11/1915 | Wilcox | 29—110.5 X |
| 3,204,377 | 9/1965 | Johnson | 156—71 X |
| 3,576,091 | 4/1971 | Shull et al. | 156—71 X |
| 1,534,559 | 4/1925 | Yant | 29—110.5 |

EDWARD G. WHITBY, Primary Examiner

U.S. Cl. X.R.

29—110.5, 129.5; 156—579, 582